(12) United States Patent
Amaral et al.

(10) Patent No.: US 12,078,276 B2
(45) Date of Patent: Sep. 3, 2024

(54) DOUBLE WALLED FUEL LINE COUPLING COMPONENTS AND ASSEMBLIES CAPABLE OF MULTIPLE DEGREES OF DISPLACEMENT

(71) Applicant: EMBRAER S.A., São José dos Campos (BR)

(72) Inventors: Diego Faria Amaral, São José dos Campos (BR); Fausto Macedo Bastos, São José dos Campos (BR); Fernando Gonçalves Gastaldo, São José dos Campos (BR); Juliano Vilela De Carvalho, São José dos Campos (BR); Kleber Vilela Ribeiro, São José dos Campos (BR); Leandro Aparecido Cardozo, São José dos Campos (BR); Marcos Vinicius, São José dos Campos (BR); Sidney Osses Nunes, São José dos Campos (BR); Vinícius Seixas Pedro, São José dos Campos (BR)

(73) Assignee: EMBRAER S.A., São José Dos Campos (BR)

( * ) Notice: Subject to any disclaimer, the term of this patent is extended or adjusted under 35 U.S.C. 154(b) by 146 days.

(21) Appl. No.: 17/874,778

(22) Filed: Jul. 27, 2022

(65) Prior Publication Data
US 2024/0035605 A1 Feb. 1, 2024

(51) Int. Cl.
*F16L 39/04* (2006.01)
*F16L 39/00* (2006.01)

(52) U.S. Cl.
CPC ............. *F16L 39/04* (2013.01); *F16L 39/005* (2013.01)

(58) Field of Classification Search
CPC ....... F16L 39/04; F16L 39/005; F16L 23/036; F16L 27/053
See application file for complete search history.

(56) References Cited

U.S. PATENT DOCUMENTS 2,650,112 A * 8/1953 Kinkead ............... F16L 39/005
285/422
3,199,898 A * 8/1965 Faccou .................. F16L 39/04
137/340

(Continued)

FOREIGN PATENT DOCUMENTS

CN 105240636 A * 1/2016 .............. F16L 39/04
DE 4331194 C1 * 10/1994 ............ F16L 39/005

(Continued)

*Primary Examiner* — Matthew Troutman
*Assistant Examiner* — Fannie C Kee
(74) *Attorney, Agent, or Firm* — NIXON & VANDERHYE P.C.

(57) ABSTRACT

A fuel line coupling component (e.g., for aircraft fuel lines) allow for axial, rotational and radial displacements. The fuel line coupling component includes outer and inner tubular members with each having coaxially aligned pairs of coaxially sleeved tubular sections that are coaxially displaceable relative to one another. A pair of terminal end connectors includes a journalled connection assembly with the respective opposed distal ends of the outer and inner tubular members to thereby allow simultaneous rotational movements of the outer and inner tubular members about a longitudinal axis thereof and simultaneous radial displacements of outer an inner tubular members relative to a reference plane. C-clamps associated with fuel tank fittings and band clamps allow coupling of the fuel line coupling component to the fuel tank fittings and thereby fluid-connect aircraft fuel tanks (e.g., the aircraft main and auxiliary fuel tanks).

17 Claims, 12 Drawing Sheets

(56) References Cited

U.S. PATENT DOCUMENTS

| | | | | |
|---|---|---|---|---|
| 3,834,341 | A | * | 9/1974 | Sexton .................. F16L 39/005 440/89 C |
| 4,850,616 | A | * | 7/1989 | Pava ....................... F16L 39/04 285/330 |
| 5,011,193 | A | * | 4/1991 | Porte ..................... F16L 39/005 285/31 |
| 5,054,523 | A | * | 10/1991 | Rink ..................... F16L 39/005 285/123.17 |
| 5,782,579 | A | * | 7/1998 | Dupouy ................ F16L 39/005 141/86 |
| 6,513,838 | B2 | | 2/2003 | Poehler |
| 7,717,473 | B1 | * | 5/2010 | Zhang .................... F16L 39/04 285/302 |
| 9,933,093 | B2 | | 4/2018 | Corrêa et al. |
| 10,088,085 | B2 | * | 10/2018 | Saito ....................... F16L 39/04 |
| 2003/0217778 | A1 | * | 11/2003 | Challender ............ F16L 39/04 138/114 |
| 2004/0026922 | A1 | * | 2/2004 | Carns ................... F16L 39/005 285/123.15 |
| 2007/0051404 | A1 | * | 3/2007 | Challender ............ F16L 39/04 137/15.1 |
| 2009/0256352 | A1 | * | 10/2009 | Petit ..................... F16L 39/005 285/123.15 |

FOREIGN PATENT DOCUMENTS

| | | | | |
|---|---|---|---|---|
| EP | 1116917 | A1 | * 7/2001 | ............ F16L 39/005 |
| KR | 20120067073 | A | * 6/2012 | .............. F16L 39/04 |

* cited by examiner

DOUBLE WALLED FUEL LINE COUPLING COMPONENTS AND ASSEMBLIES CAPABLE OF MULTIPLE DEGREES OF DISPLACEMENT

FIELD

The embodiments disclosed herein relate generally to aircraft fuel system components, especially aircraft fuel line coupling components. In preferred embodiments, the fuel line coupling components allow relative multiple degrees of displacement (e.g., axial, rotational and radial) between opposed terminal ends of a fuel line which the coupling interconnects, especially auxiliary fuel tanks housed within the pressurized portion of the aircraft fuselage.

BACKGROUND

Fuel line couplings that are presently known in the art for interconnecting fuel tanks do not comply with specific requirements for installation of auxiliary fuel tanks inside the aircraft fuselage since such installation involves the need for the coupling component to exhibit large relative displacements in the event of a crash without causing leakage, fault tolerance lightning protection design and/or a double wall construction with a quick disconnect feature. The current auxiliary tank installation techniques do not comply with all the desired requirements necessary for installation since they use simple metal piping, standard flexible couplings, threaded connections and hoses.

Known proposals in the art include U.S. Pat. Nos. 10,088,085, 9,933,093 and 6,513,838 (the entire contents of which are hereby expressly incorporated herein by reference). While such prior proposals include fuel line coupling components that address certain issues with the installation and interconnection of auxiliary fuel tanks within an aircraft's fuselage, further improvements are desired. It is towards providing such improvements that the embodiments disclosed herein are directed.

SUMMARY

Broadly, the embodiments disclosed herein are especially adapted to connect fuel lines in an aircraft, e.g., the fuel lines which fluid-connect an aircraft auxiliary fuel tank(s) to its main fuel tank(s). The coupling component embodiments are structurally adapted to allow relative displacements axially, rotationally and radially between parts and provide a relatively quick-disconnect coupling capability using simple tools. The coupling component also includes effective electrical bonding connection. An aircraft provided with the fuel line coupling component as herein described will also be compliant with survivable crash and lightning strike certification requirements.

According to certain embodiments, the fuel line coupling component includes an outer tubular member having a coaxially aligned pair of outer tubular sections that are coaxially displaceable relative to one another and an inner tubular member which is coaxially sleeved within the outer tubular member so as to define an annular space therebetween, the inner tubular member having a coaxially sleeved pair of inner tubular sections that are coaxially displaceable relative to one another. A pair of terminal end connectors having a journalled connection assembly with the respective opposed distal ends of the outer and inner tubular members are provided which allow simultaneous rotational movements of the outer and inner tubular members about a longitudinal axis thereof and simultaneous radial displacements of outer an inner tubular members relative to a reference plane.

The journalled connection assembly associated with the terminal end connectors may be a ball and socket connection assembly. More specifically, ball segments may be positioned at respective distal terminal ends of the outer and inner tubular members while socket segments may be defined by the terminal end connectors so as to journally receive a respective one of the ball segments.

The terminal end connectors may be flanged to allow connection between and to opposed ends of a fuel line. Further, the terminal end connectors may include at least one (preferably a circumferentially spaced apart series of) radially extending connection lobe.

The terminal end connectors of certain embodiments may include respective electrical bonding straps to electrically bond the terminal end connectors to the outer tubular sections of the outer tubular member. Similarly, the inner tubular member may include pairs of static brushes to electrically bond the inner tubular sections to the terminal end connectors.

An aircraft may thus be provided with a fuel tank coupling assembly having a pair of fuel tank fittings each adapted to being immovably fixed to a respective fuel tank, and the fuel coupling component as briefly described above having its opposed ends thereof connected to respective ones of the fuel tank fittings. Each of the fuel tank fittings may thus be provided with an opposed pair of C-clamps having one end pivotally connected to the respective fuel tank fitting and an opposite end thereof adapted to being aligned with and removably connected to a respective one of the connection lobes of the terminal end connectors.

Certain embodiments of the fuel tank coupling assembly will be provided a fitting flange associated with each of the fuel tank fittings and a connection flange associated with each of the terminal end connectors and adapted to being adjacently mated with a respective fitting flange of the fuel tank fittings. The coupling assembly may therefore further comprise a pair of band clamps (preferably having a V-shaped cross-section) each circumferentially engaged with and in clamping contact with respective adjacently mated fitting and connection flanges. Each of the band clamps will preferably include a turnbuckle adjustment mechanism to allow each band clamp to be tightened circumferentially so as to clamp the respectively adjacent mated fitting and connection flanges one to one another.

These and other aspects and advantages of the present invention will become more clear after careful consideration is given to the following detailed description of the preferred exemplary embodiments thereof.

BRIEF DESCRIPTION OF ACCOMPANYING DRAWINGS

The disclosed embodiments of the present invention will be better and more completely understood by referring to the following detailed description of exemplary non-limiting illustrative embodiments in conjunction with the drawings of which.

DETAILED DESCRIPTION

Figure 1:
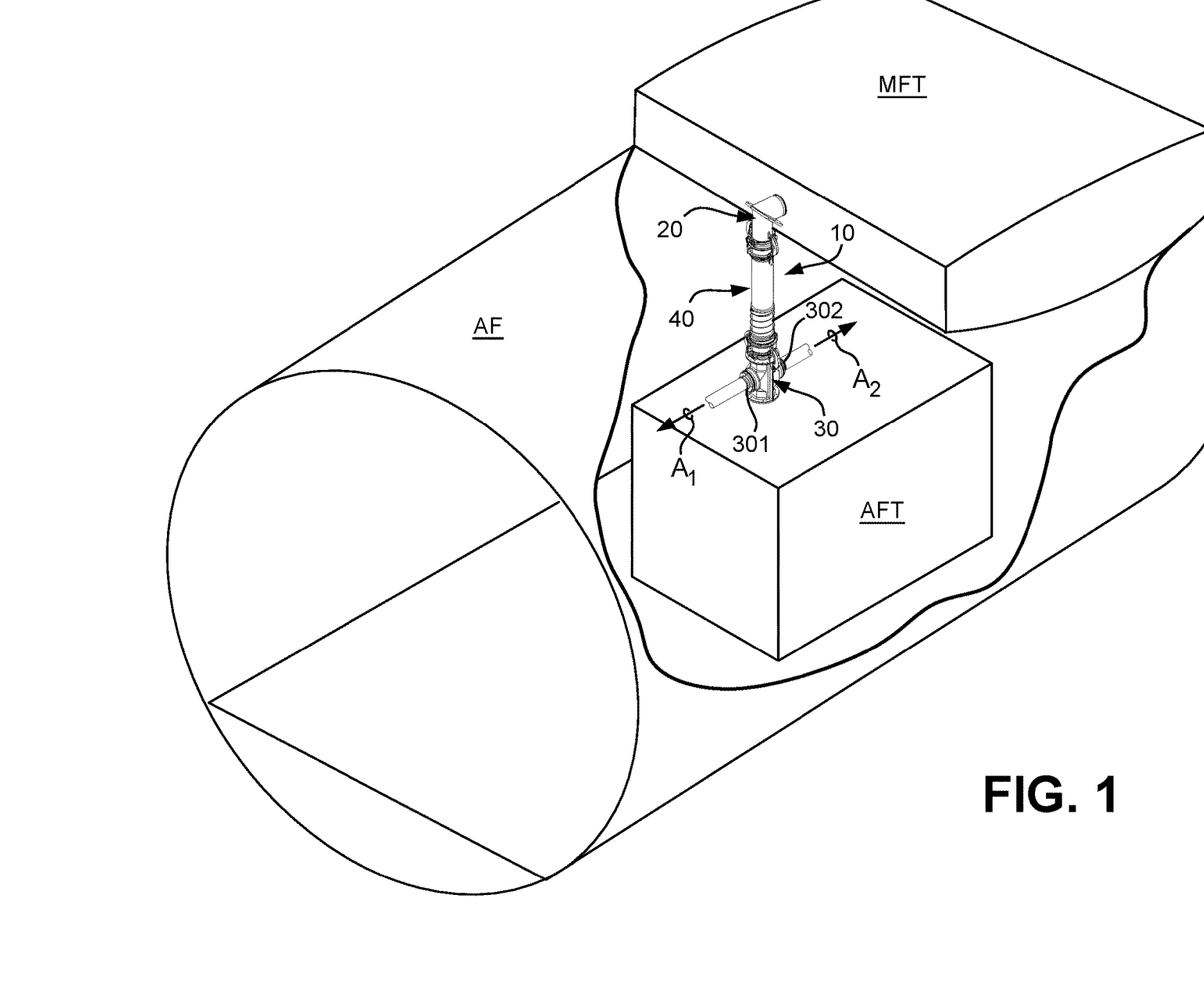
FIG. 1 is a perspective view of a partially exposed aircraft fuselage section depicting an exemplary installation assembly for a fuel line coupling assembly in accordance with an embodiment of the invention as described hereinafter adapted to fluid-connect one (or more) auxiliary fuel tanks within an aircraft fuselage with a main wing mounted fuel tank.
Figure 2:
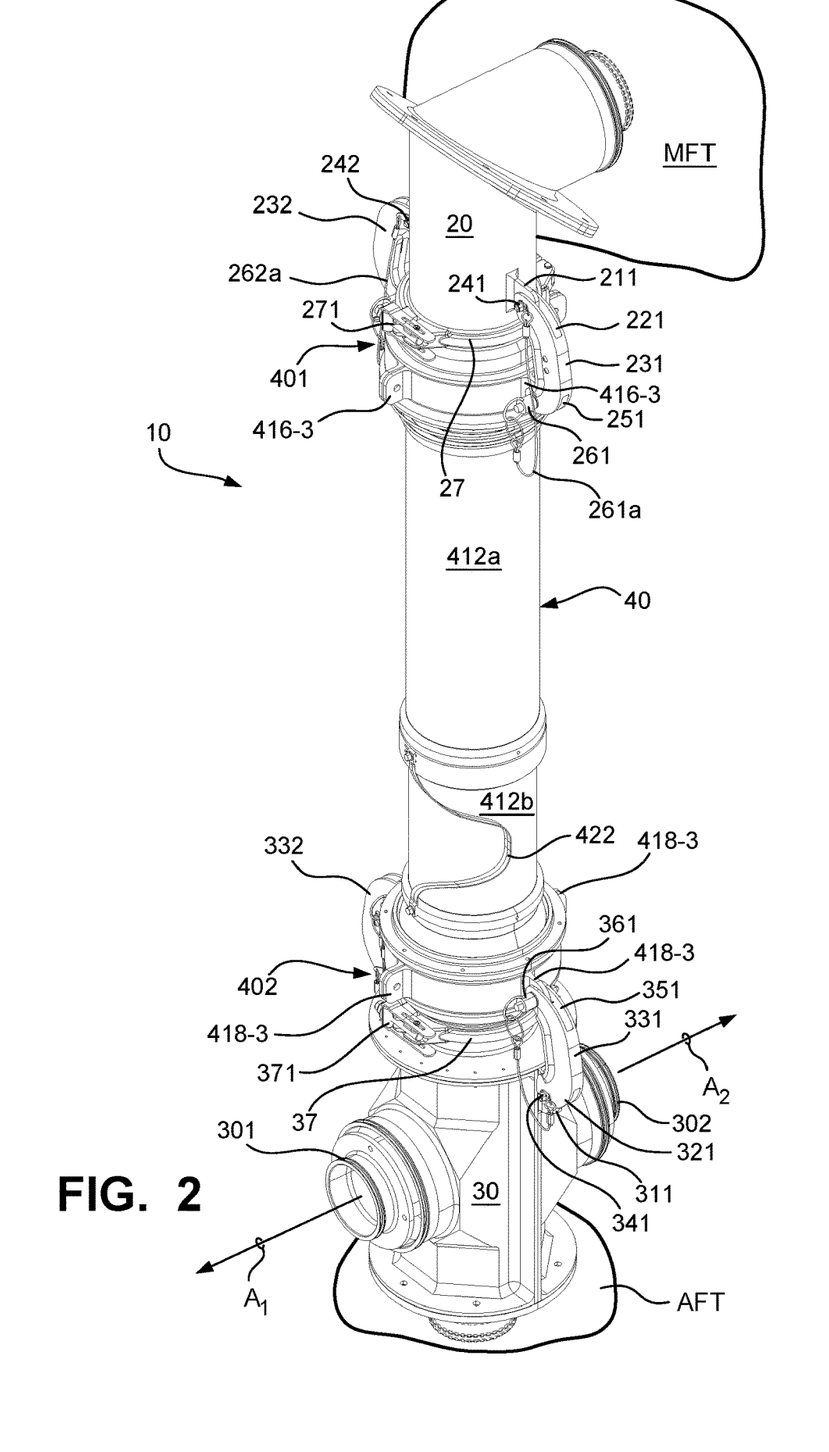
FIG. 2 is an enlarged perspective view of the exemplary installation assembly for the fuel line coupling component as shown in FIG. 1.

Accompanying FIG. 1 schematically depicts a fuel line coupling assembly 10 installed so as to fluid-connect an auxiliary fuel tank AFT positioned within the aircraft fuselage AF to a main fuel tank MFT that is provided internally of the aircraft wing (not shown). As is perhaps better shown by FIGS. 2-9, the fuel line coupling assembly 10 generally includes upper and lower tank fittings 20, 30 that are interconnected with a double walled coupling component 40 to be described in greater detail below. The upper fitting 20 serves to fluid-connect the upper end of the coupling component 40 to the main fuel tank MFT while the lower fitting serves to fluid-connect the lower end of the tubular coupling component 40 to the auxiliary fuel tank AFT. Side ports 301, 302 are provided by the lower fitting 30 so as to allow fluid-connection with additional auxiliary fuel tanks (not shown) positioned within the aircraft fuselage AF as depicted by arrows A1 and A2, respectively.

In the embodiment depicted, the upper fitting 20 is a 90° angled fitting having one end connected to the main fuel tank MFT and an opposite end removably coupled to the upper end 401 of the coupling component 40. The upper fitting 20 includes a pair of diametrically opposed apertured connection ears 211, 212 to which the upper split ends 221, 222 of C-clamps 231, 232 are pivotally connected by way of bolt/nut assemblies 241, 242, respectively. The opposite split ends 251, 252 of the C-clamps 231, 232 are adapted to receive respective ones of the radially opposed apertured connection lobes 416-3 associated with the upper end 401 of the coupling component 40. An additional pair of radially opposed apertured connection lobes 416-3 that are circumferentially spaced apart by about 90° from the lobes 416-3 to which the C-clamps 231, 232 are attached may also be provided at the upper end 401 of the coupling component 40 to allow ease of positioning and connection of the upper end 401 to the upper fitting 20. As can be seen, a pair of quick disconnect pins 261, 262 are preferably provided with associated lanyard wires 261a, 262a attached to the bolt/nut assemblies 241, 242 so as to allow quick connection/disconnection of the split ends 251, 252 of the C-clamps 231, 232 with the respective ones of the radially opposed apertured connection lobes 416-3.

Figure 3:
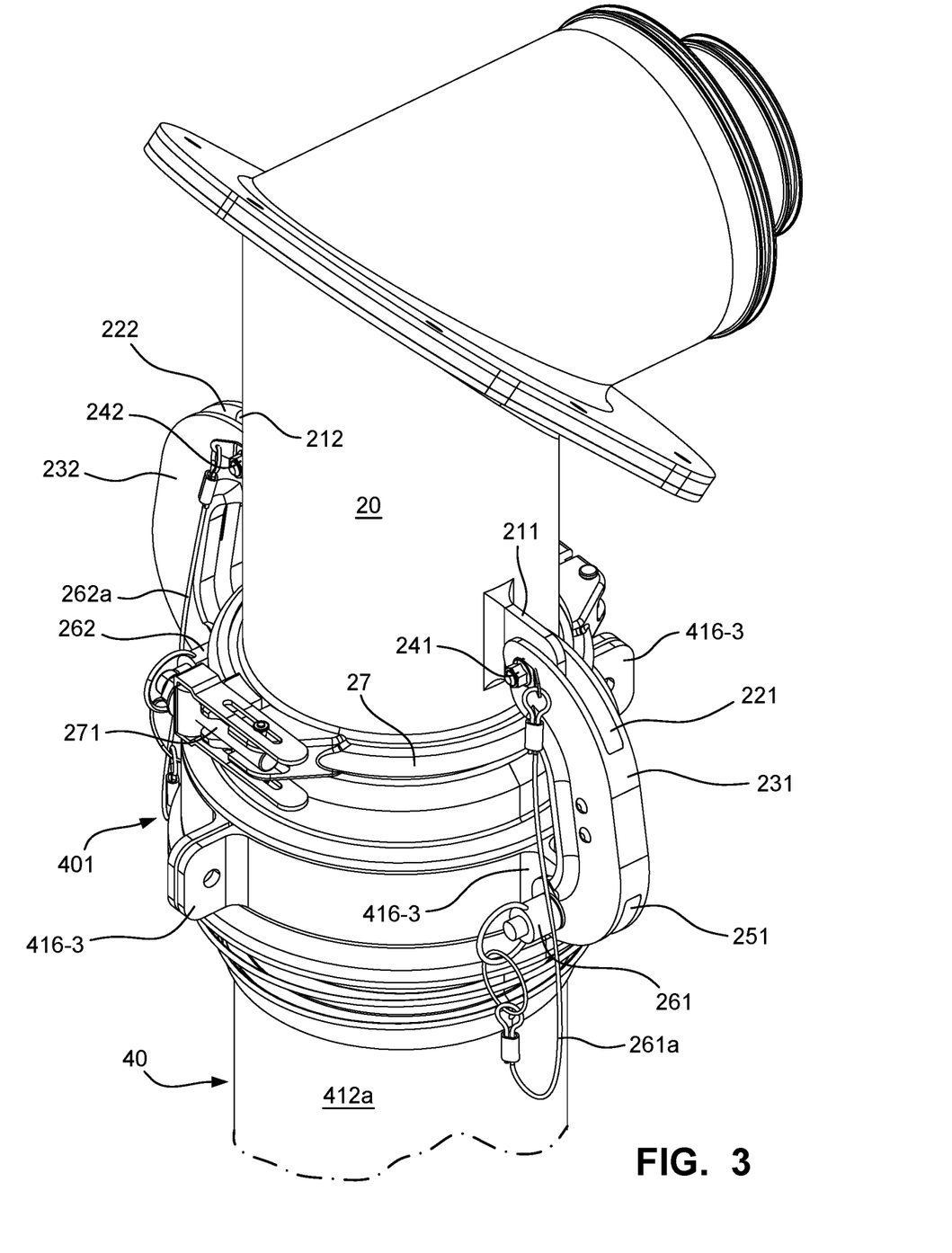
FIG. 3 is a further enlarged partial upper end perspective view of the exemplary installation assembly as shown in FIG. 2.
Figure 4:
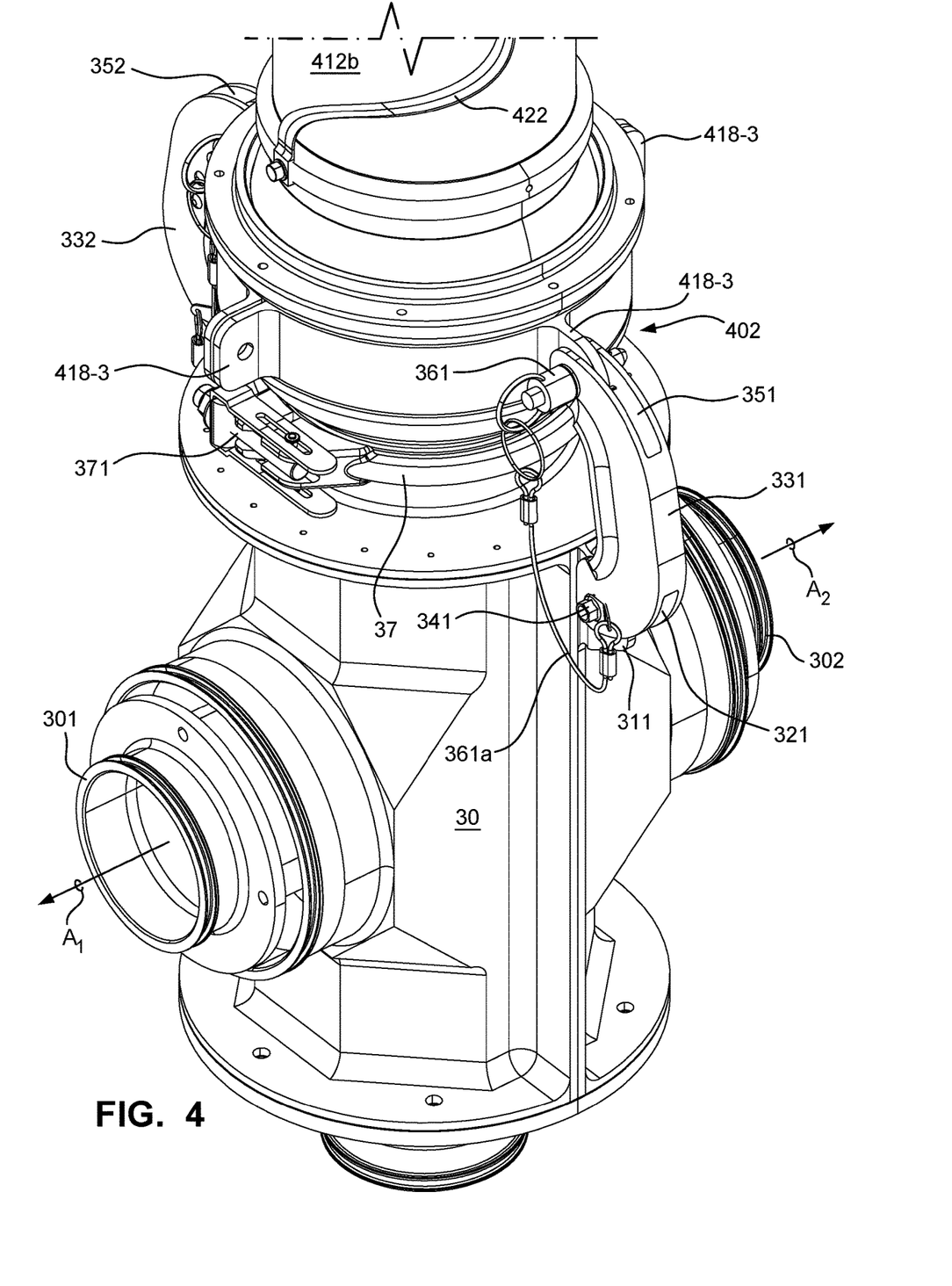
FIG. 4 is a further enlarged partial lower end perspective view of the exemplary installation assembly as shown in FIG. 2.
Figure 5:
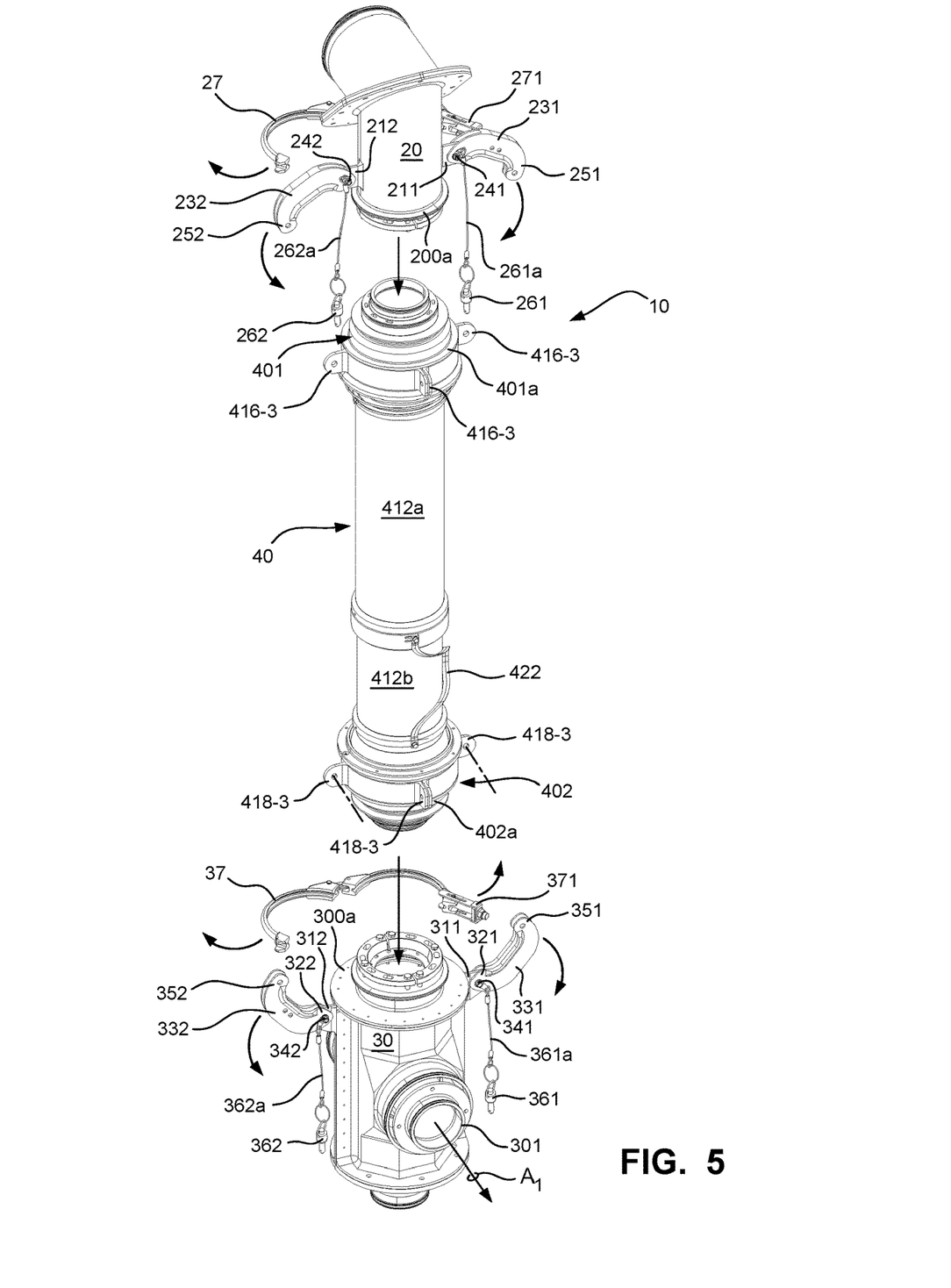
FIG. 5 is an exploded perspective view of the exemplary installation assembly shown in FIG. 2.
Figure 6:
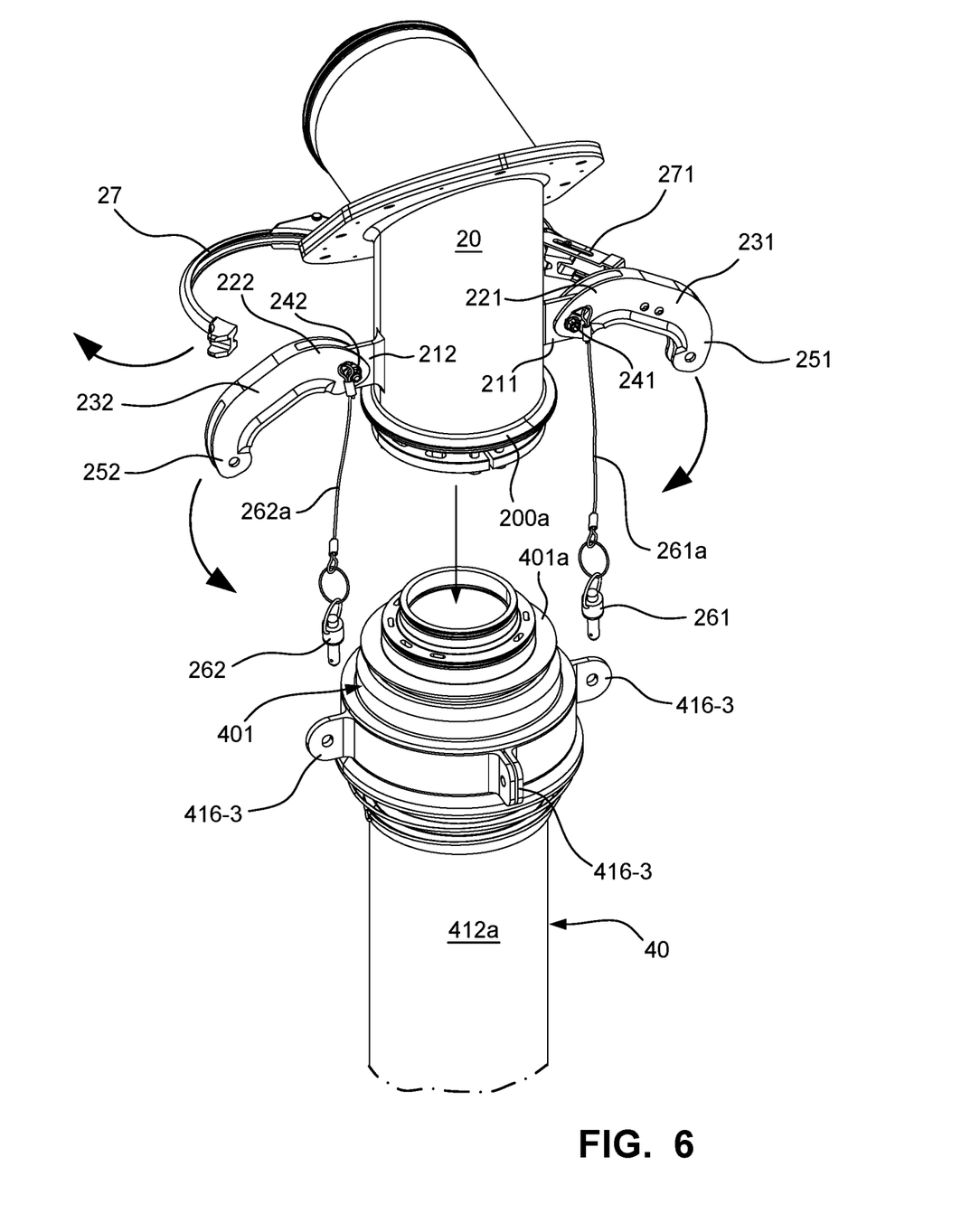
FIG. 6 is an enlarged exploded front perspective view of the upper end of the exemplary installation assembly shown in FIG. 5.
Figure 7:
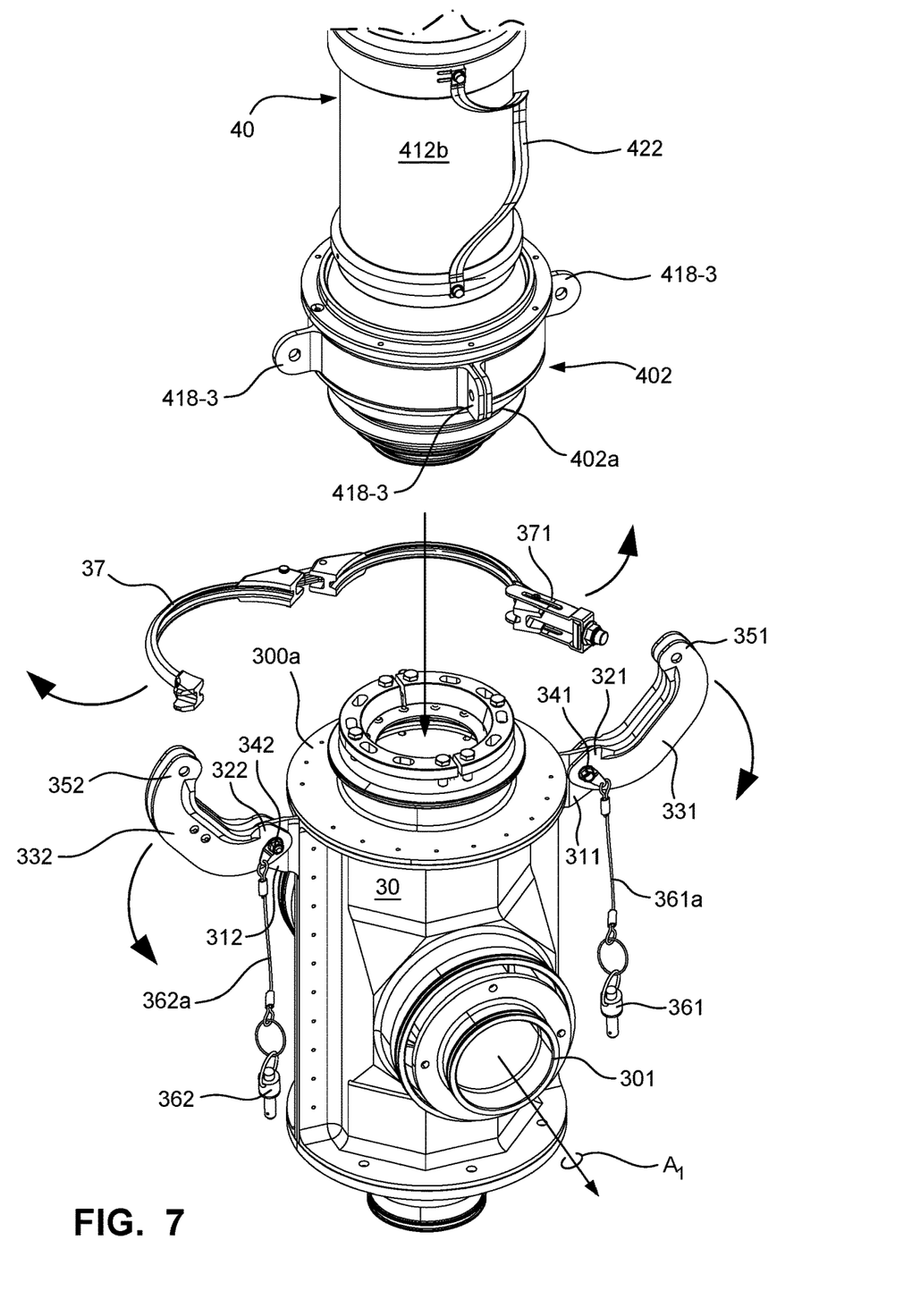
FIG. 7 is an enlarged exploded front perspective view of the lower end of the exemplary installation assembly shown in FIG. 5.
Figure 8:
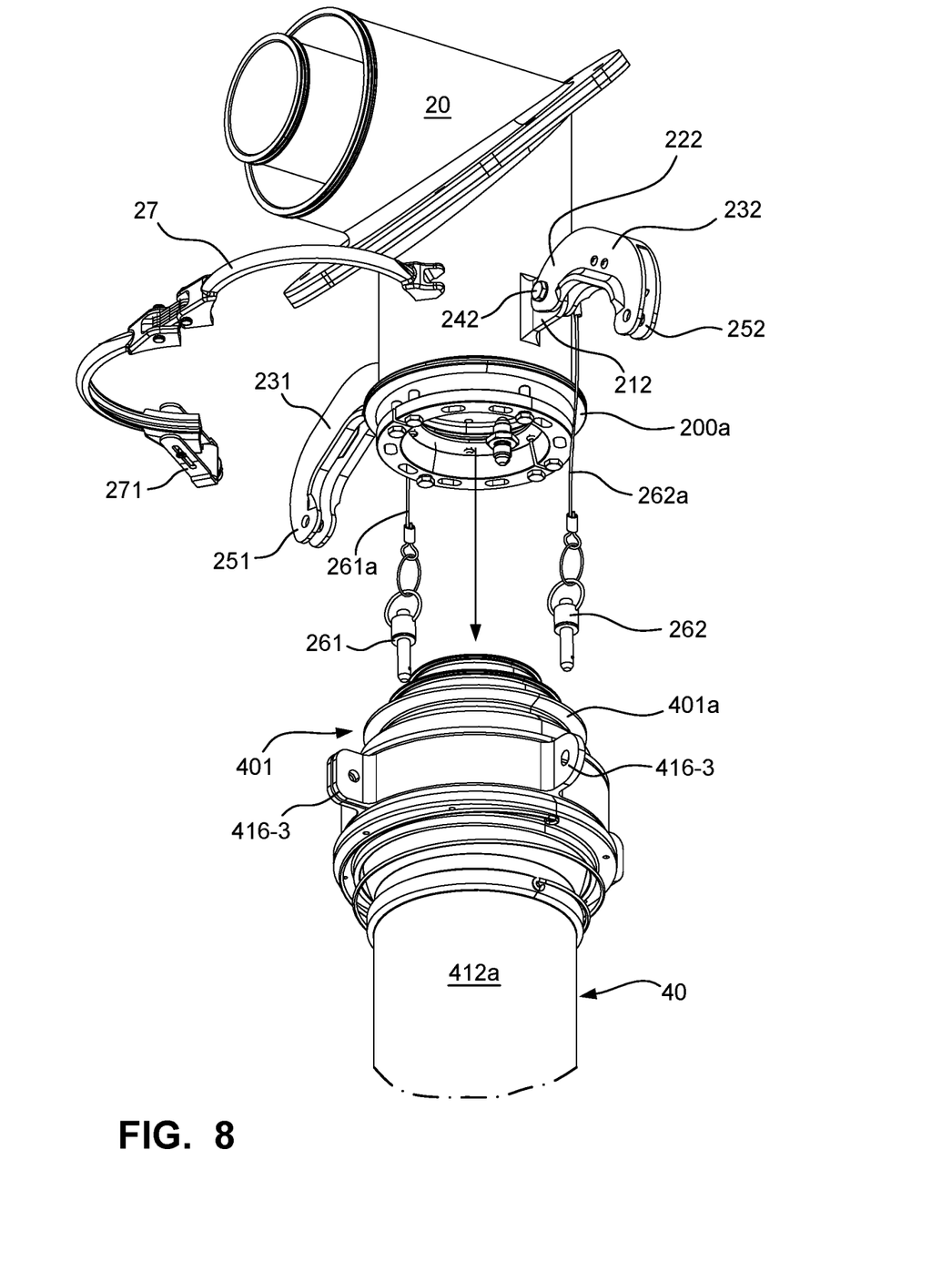
FIG. 8 is an enlarged exploded rear perspective view of the upper end of the exemplary installation assembly shown in FIG. 5.
Figure 9:
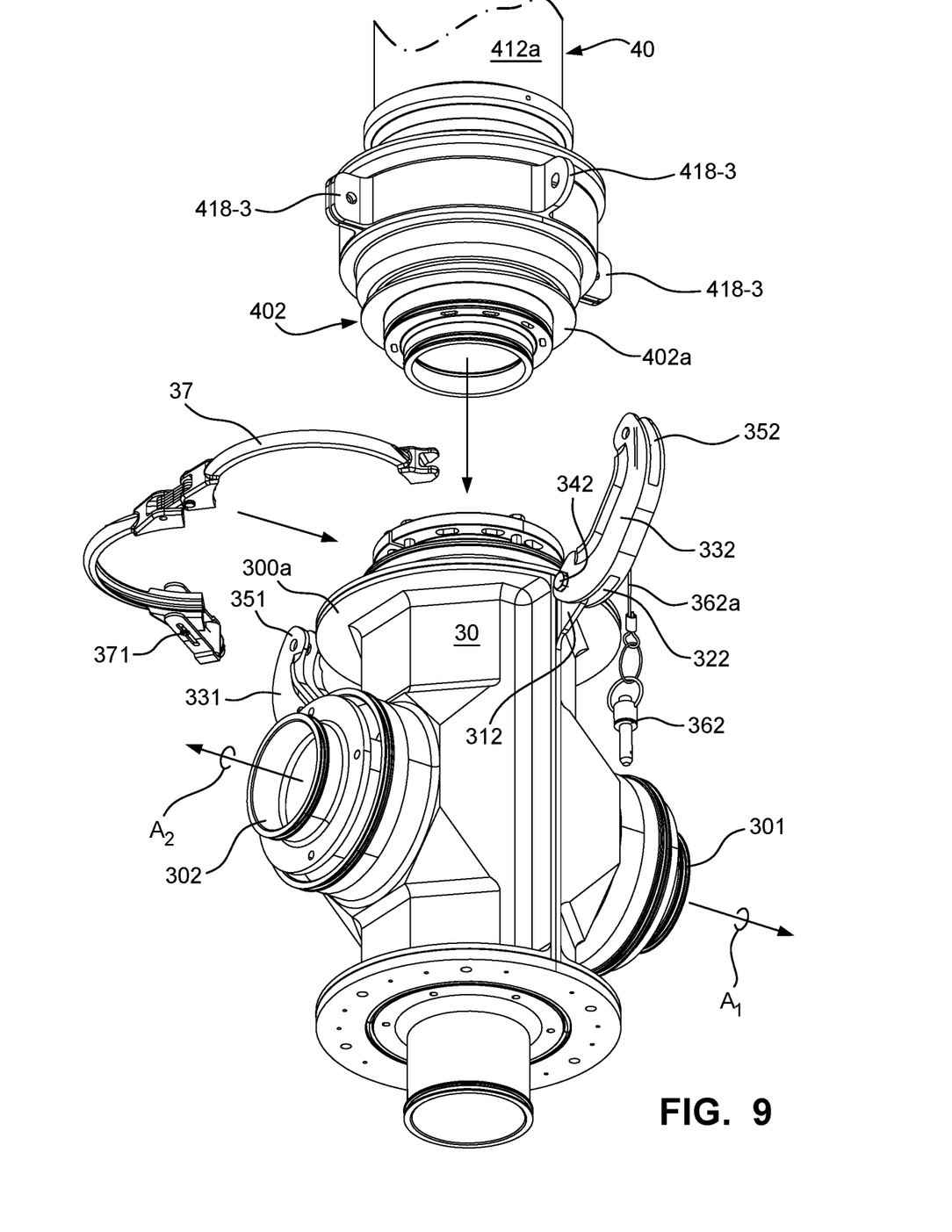
FIG. 9 is an enlarged exploded rear perspective view of the lower end of the exemplary installation assembly shown in FIG. 5.

A band clamp 27 having a generally V-shaped cross-sectional shape is also preferably provided so as to circumferentially engage the mated flanges 200a and 401a of the upper fitting 20 and the upper end 401 of the coupling component 40, respectively (see FIGS. 3, 6 and 8). The band clamp 27 preferably includes a turnbuckle adjustment mechanism 271 to allow the band clamp 27 to be tightened circumferentially so as to clamp the mated flanges 200a, 401a one to one another.

As noted previously, the lower fitting 30 associated with the auxiliary fuel tank AFT may have opposed coupling ports 301, 302 to fluid connect the fitting 30 with other auxiliary fuel tanks positioned within the aircraft fuselage (i.e., as noted by arrows A1 and A2). The lower fitting 30 has a lower end fluid-connected to the auxiliary fuel tank AFT and an opposite end removably coupled to the lower end 402 of the coupling component 40. Similar to the upper fitting 20, the lower fitting 30 includes a pair of diametrically opposed apertured connection ears 311, 312 to which the lower split ends 321, 322 of C-clamps 331, 332 are pivotally connected by way of bolt/nut assemblies 341, 342, respectively. The opposite split ends 351, 352 of the C-clamps 331, 332 are adapted to receive respective ones of the radially opposed apertured connection lobes 418-3 associated with the lower end 402 of the coupling component 40. An additional pair of radially opposed apertured connection lobes 418-3 that are circumferentially spaced apart by about 90° from the lobes 418-3 to which the C-clamps 331, 332 are respectively connected may also be provided at the lower end 402 of the coupling component 40 to allow ease of positioning and connection of the lower end 402 to the lower fitting 30. As can be seen, a pair of quick disconnect pins 361, 362 are preferably provided with associated lanyard wires 361a, 362a attached to the bolt/nut assemblies 341, 342 so as to allow quick connection/disconnection of the split ends 351, 352 of the C-clamps 331, 332 with the respective ones of the radially opposed apertured connection lobes 418-3.

A band clamp 37 having a generally V-shaped cross-sectional shape is also preferably provided so as to circumferentially engage the mated flanges 300a and 402a of the lower fitting 30 and the lower end 402 of the coupling component 40, respectively (see FIGS. 4, 5, 7 and 9). The band clamp 37 preferably includes a turnbuckle adjustment mechanism 371 to allow the band clamp 37 to be tightened circumferentially so as to clamp the mated flanges 300a, 402a one to one another.

Figure 10:
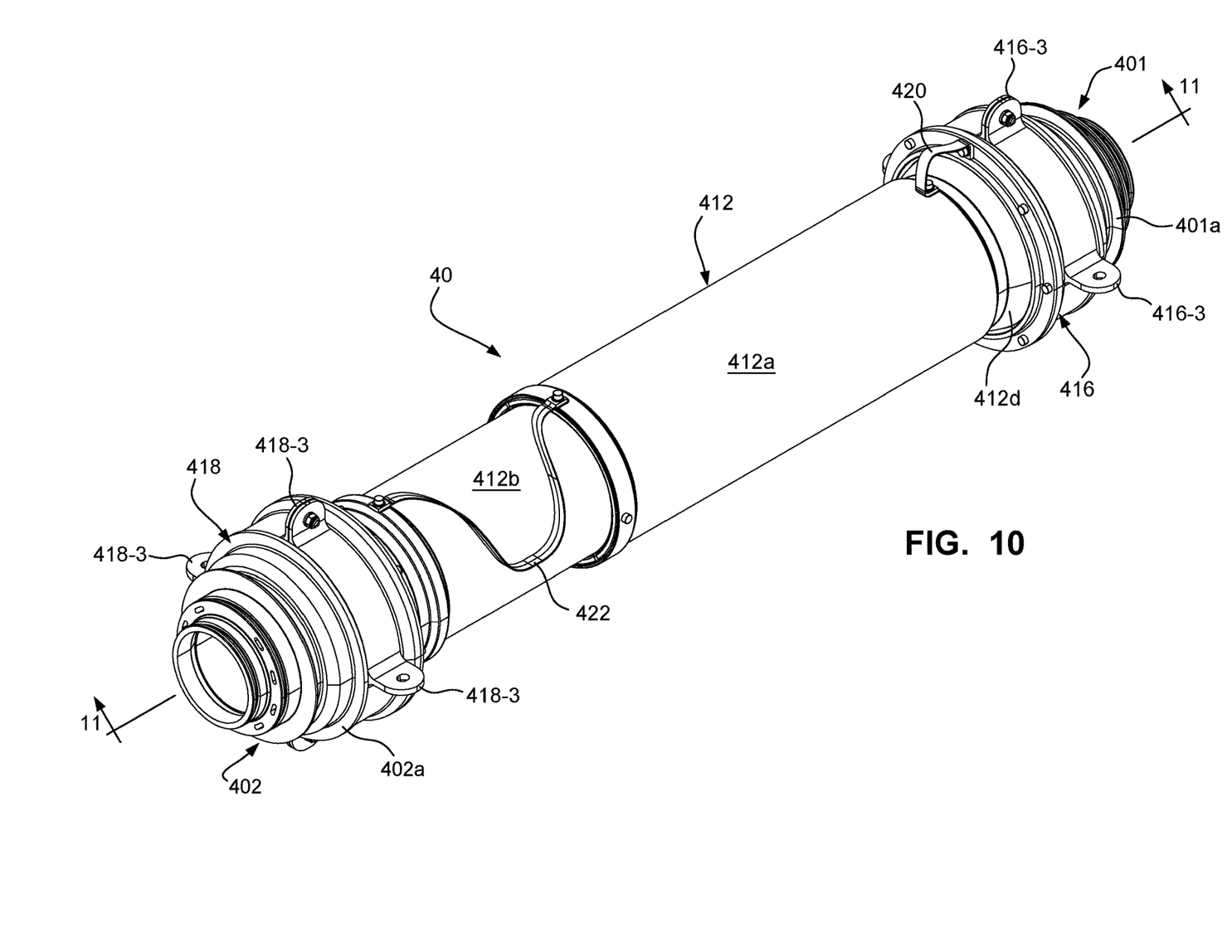
FIG. 10 is a perspective view of the double wall axially moveable fuel line coupling component provided with journalled end connections.
Figure 11:
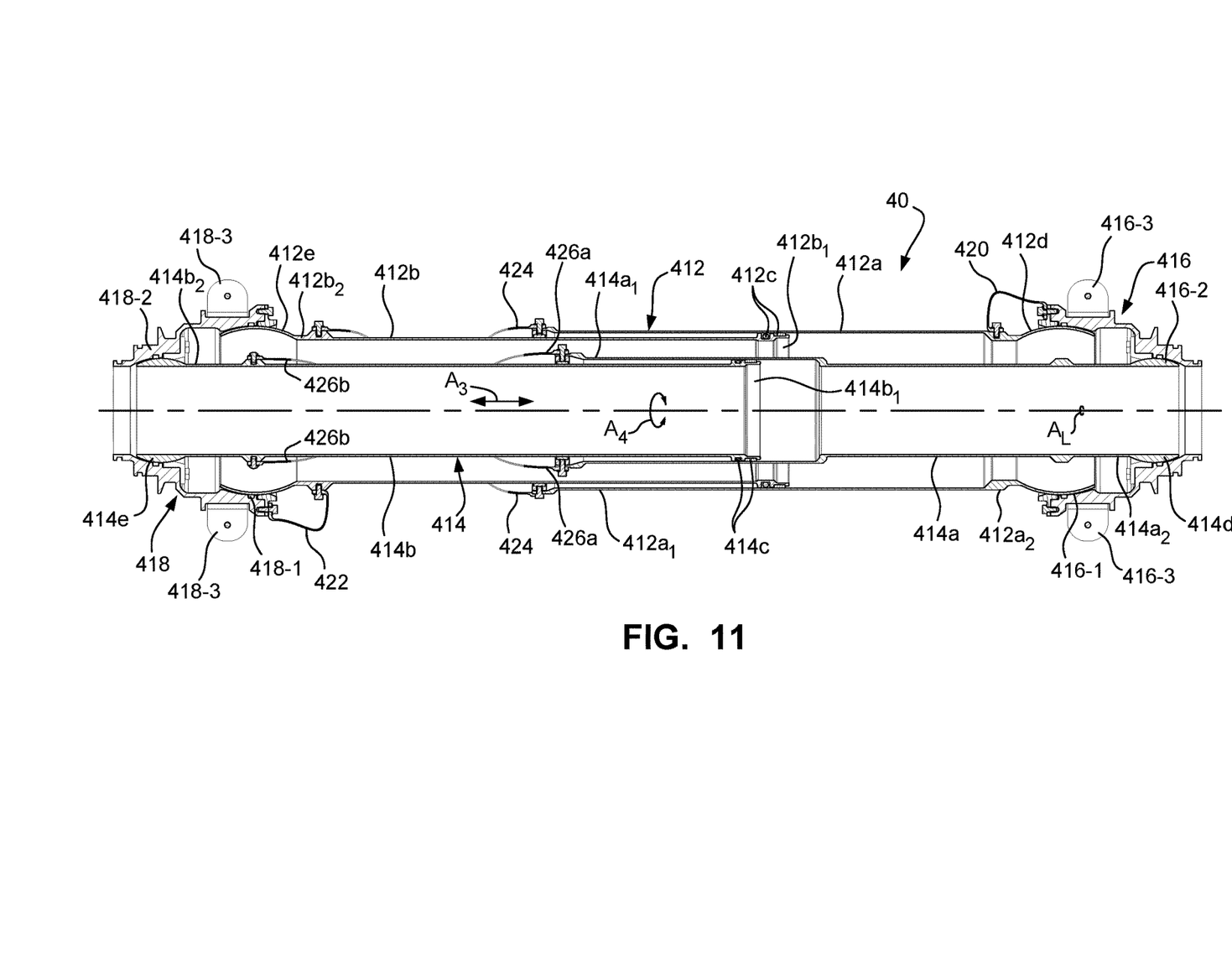
FIG. 11 is a cross-sectional elevational view of the fuel line coupling component as taken along line 11-11 in FIG. 10.
Figure 12:
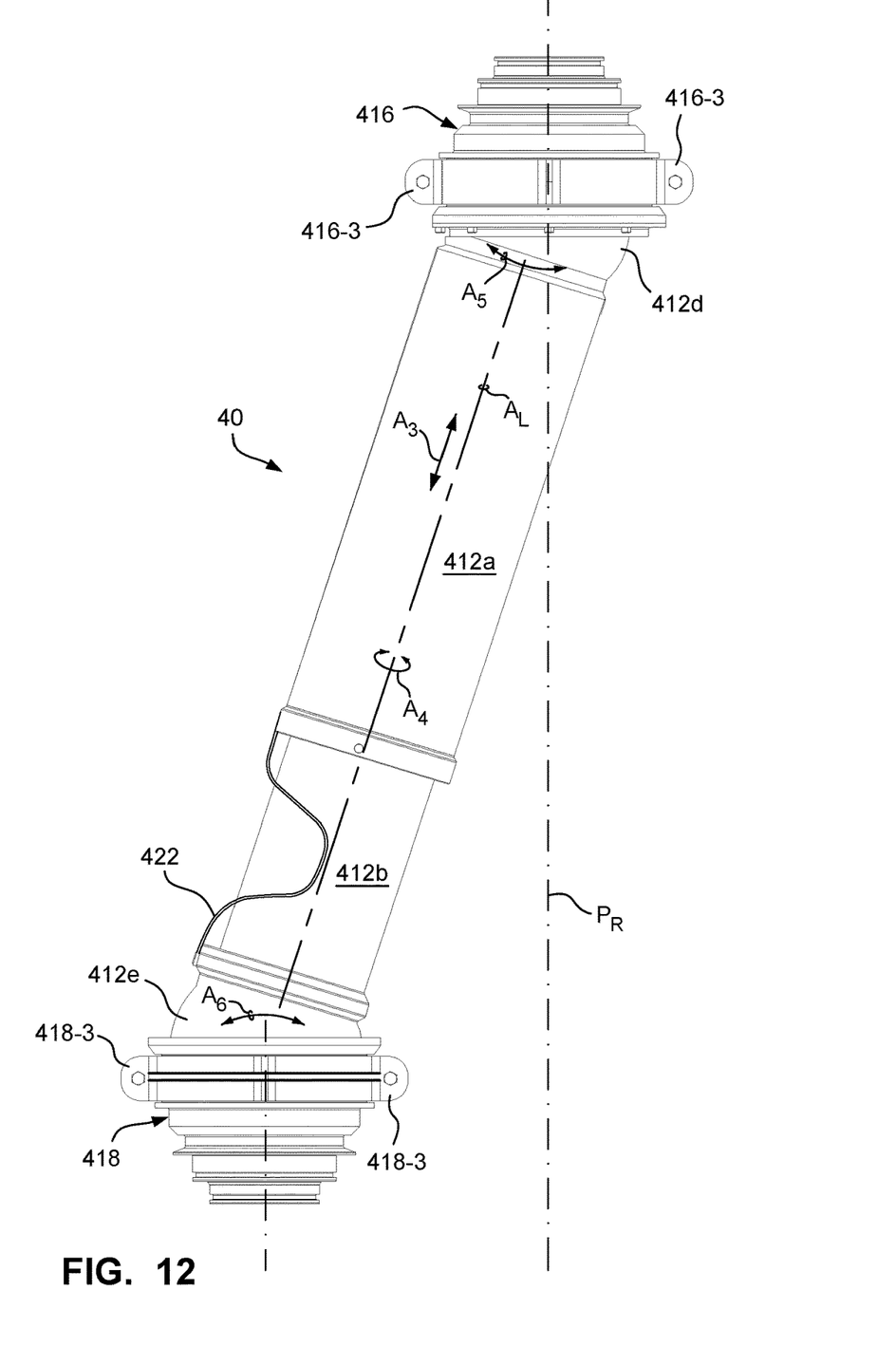
FIG. 12 is a side elevational view of the exemplary fuel line coupling component depicted in FIG. 10 showing the freedoms of movement that are available by the component interconnections.

The double walled coupling component 40 is shown in greater detail in accompanying FIGS. 10-12 and includes coaxially positioned rigid outer and inner tubular members 412 and 414, respectively, each comprising a telescopically sleeved pair of outer and inner tubular sections 412a, 412b and 414a, 414b, respectively. The proximal terminal ends 412b1, 414b1 of each of the outer and inner tubular sections 412b, 414b are provided with sliding elastomeric O-ring seals 412c, 414c, respectively, so as to provide a fluid-tight seal and allow reciprocal coaxial displacements between the outer and inner tubular sections 412a, 412b and 414a, 414b, respectively, relative to the longitudinal axis $A_L$ of the coupling component 40. In such a manner, therefore, both the outer and inner tubular members 412, 414, respectively, are axially displaceable (e.g., about 45 mm+/−) and can therefore simultaneously be telescopically extended/retracted coaxially along the longitudinal axis $A_L$ as shown by arrow A3 in FIG. 11.

The distal terminal ends 412a2, 412b2 and 414a2, 414ab2 of the outer and inner tubular members 412, 414 are journally coupled to flanged terminal end connectors 416, 418, respectively. More specifically, each of the distal terminal ends 412a2, 414a2 of the outer and inner tubular sections 412a, 414a, respectively, is journally coupled to the terminal end connector 416 while each of the distal terminal ends 412b2, 414b2 of the outer and inner tubular sections 412b, 414b, respectively, is journally coupled to the terminal end connector 418. The flanged terminal end connectors 416, 418 may thus be coupled to the respective upper and lower tank fittings 30, 40 as has been described above.

The journaled coupling of the terminal ends 412a2, 412b2 and 414a2, 414b2 to the end connectors 416, 418, respectively, is preferably accomplished by a ball and socket joint structure. In this regard, as is perhaps more clearly shown in FIG. 11, the distal terminal ends 412a2, 412b2 terminate in spherical ball segments 412d, 412e while the distal terminal ends 414a2, 414b2 terminate in spherical ball segments 414d, 414e, respectively. Each of the end connectors 416, 418 in turn defines spherical socket segments 416-1, 416-2 and 418-1, 418-2 which journally receive the spherical ball segments 412d, 412e and 414d, 414e, respectively. As is shown in FIG. 12, such journaled coupling of the terminal ends 412a2, 412b2 and 414a2, 414b2 to the end connectors 416, 418, respectively, thereby allows the outer and inner tubes 412, 414 to collectively rotate 360° about the elongate axis $A_L$ as shown by arrow A4 as well as to within limits swivel relative to each of the connectors 416, 418 as shown by arrows A5, A6 so as to be capable of radial displacements (e.g., up to about 218 mm+/−) relative to a reference vertical plane $P_R$.

It will be appreciated that in use no fuel will be present within the interior annular space defined between the coaxially aligned outer and inner tubular members 412, 414, respectively. In order to prevent a hydraulic air lock from occurring upon telescopic movement of the coaxially aligned outer and inner tubular members 412, 414, respectively, it is preferred that suitable vent apertures (not shown) be provided so as to establish communication between the exterior ambient atmosphere and the annular space.

Electrical bonding straps 420, 422 and 424 are provided so as to electrically bond the end connectors 416, 418 to the outer tubular sections 412a, 412b, respectively, and thereby establish electrical continuity therebetween. Internal electrical continuity between the end connectors 416, 418 and the inner tubular sections 414a, 414b is provided by circumferentially spaced apart static brushes 426a connected to and carried by the inner tubular section 414a and circumferentially spaced apart static brushes 426b attached to the inner tubular section 414b. The bonding straps 420, 422, 424 and static brushes 426a, 426b therefore assist in the dissipation of static electricity or sparks that may occur due to lightning induced currents.

Although the discussion above has been focused on a fuel coupling component that is usefully employed in an aircraft, it will be understood that the description provided herein is presently considered to be the most practical and preferred embodiments of the invention. Thus, the fuel line component as described herein may be employed with any vehicle. As such, the invention is not to be limited to the disclosed embodiments, but on the contrary, is intended to cover various modifications and equivalent arrangements included within the spirit and scope thereof.

What is claimed is:

1. A fuel line coupling component for coupling coaxially aligned first and second fuel lines to allow displacements therebetween, wherein the fuel line coupling component comprises:
   an outer tubular member having a coaxially aligned pair of outer tubular sections that are coaxially displaceable relative to one another;
   an inner tubular member which is coaxially sleeved within the outer tubular member so as to define an annular space therebetween, the inner tubular member having a coaxially sleeved pair of inner tubular sections that are coaxially displaceable relative to one another; and
   a pair of flanged terminal end connectors to allow connection between and to opposed ends of a fuel line, wherein the terminal end connectors comprise
   (i) a journalled connection assembly with the respective opposed distal ends of the outer and inner tubular members to thereby allow simultaneous rotational movements of the outer and inner tubular members about a longitudinal axis thereof and simultaneous radial displacements of the outer and inner tubular members relative to a reference plane, and
   (ii) a series of radially extending connection lobes which are circumferentially spaced apart from one another.

2. The fuel line coupling component according to claim 1, wherein the journalled connection assembly comprises a ball and socket connection assembly.

3. The fuel line coupling component according to claim 2, wherein the journalled connection assembly comprises:
   ball segments positioned at respective distal terminal ends of the outer and inner tubular members; and
   socket segments defined by the terminal end connectors which receive a respective one of the ball segments.

4. The fuel line coupling component according to claim 1, wherein the terminal end connectors comprise respective electrical bonding straps to electrically bond the terminal end connectors to the outer tubular sections of the outer tubular member.

5. The fuel line coupling component according to claim 4, wherein the inner tubular member comprises pairs of static brushes to electrically bond the inner tubular sections to the terminal end connectors.

6. The fuel line coupling component according to claim 1, wherein proximal ends of the outer and inner tubular segments include fluid-tight seals.

7. The fuel line coupling component according to claim 6, wherein the fluid tight seals comprise elastomeric O-ring seals.

8. A fuel tank coupling assembly comprising:
   a pair of fuel tank fittings each adapted to being immovably fixed to a respective fuel tank, and
   a fuel line coupling component having opposed ends thereof connected to respective ends of the fuel tank fittings, wherein the fuel line coupling component comprises:
   (i) an outer tubular member having a coaxially aligned pair of outer tubular sections that are coaxially displaceable relative to one another;

(ii) an inner tubular member which is coaxially sleeved within the outer tubular member so as to define an annular space therebetween, the inner tubular member having a coaxially sleeved pair of inner tubular sections that are coaxially displaceable relative to one another; and (iii) a pair of terminal end connectors comprising a journalled connection assembly with the respective opposed distal ends of the outer and inner tubular members to thereby allow simultaneous rotational movements of the outer and inner tubular members about a longitudinal axis thereof and simultaneous radial displacements of the outer and inner tubular members relative to a reference plane, and wherein the terminal end connectors of the fuel line coupling component comprise at least one pair of radially opposed and outwardly extending apertured connection lobes; and wherein each of the fuel tank fittings comprises an opposed pair of C-clamps having one end pivotally connected to the respective fuel tank fitting and an opposite end thereof adapted to being aligned with and removably connected to a respective one of the connection lobes of the terminal end connectors.

9. The fuel tank coupling assembly according to claim 8, wherein each of the terminal end connectors comprises a series of the radially extending connection lobes which are circumferentially spaced apart from one another.

10. The fuel tank coupling assembly according to claim 8, wherein each of the fuel tank fittings comprises a fitting flange, and each of the terminal end connectors comprises a connection flange adapted to being adjacently mated with a respective fitting flange of the fuel tank fittings, and wherein the fuel tank coupling assembly further comprises a pair of band clamps each circumferentially engaged with and in clamping contact with respective adjacently mated fitting and connection flanges.

11. The fuel tank coupling assembly according to claim 10, wherein each of the band clamps has a V-shaped cross-section shape.

12. The fuel tank coupling assembly according to claim 10, wherein each of the band clamps includes a turnbuckle adjustment mechanism to allow each band clamp to be tightened circumferentially so as to clamp the respectively adjacent mated fitting and connection flanges to one another.

13. The fuel tank coupling assembly according to claim 8, wherein the C-clamps include a quick-disconnect pin to allow removable connection of the opposite end to the respective one of the connection lobes of the terminal end connectors.

14. The fuel tank coupling assembly according to claim 13, wherein the opposite end of the C-clamps is split so as to allow the respective one of the connection lobes of the terminal end connectors to be received therein.

15. An aircraft which comprises the fuel line coupling component according to claim 1.

16. An aircraft which comprises the fuel tank coupling assembly according to claim 8.

17. An aircraft which comprises:
a main fuel tank having a main fuel tank fitting,
an auxiliary fuel tank having an auxiliary fuel tank fitting, and
the fuel line coupling component according to claim 1 having the opposed terminal end connectors thereof coupled to the main and auxiliary fuel tank fittings so as to fluidly-connect the main and auxiliary fuel tanks.

\* \* \* \* \*